May 5, 1953 W. F. MITCHELL 2,637,224
RIDGE REAMER
Filed Sept. 3, 1949 2 SHEETS—SHEET 1
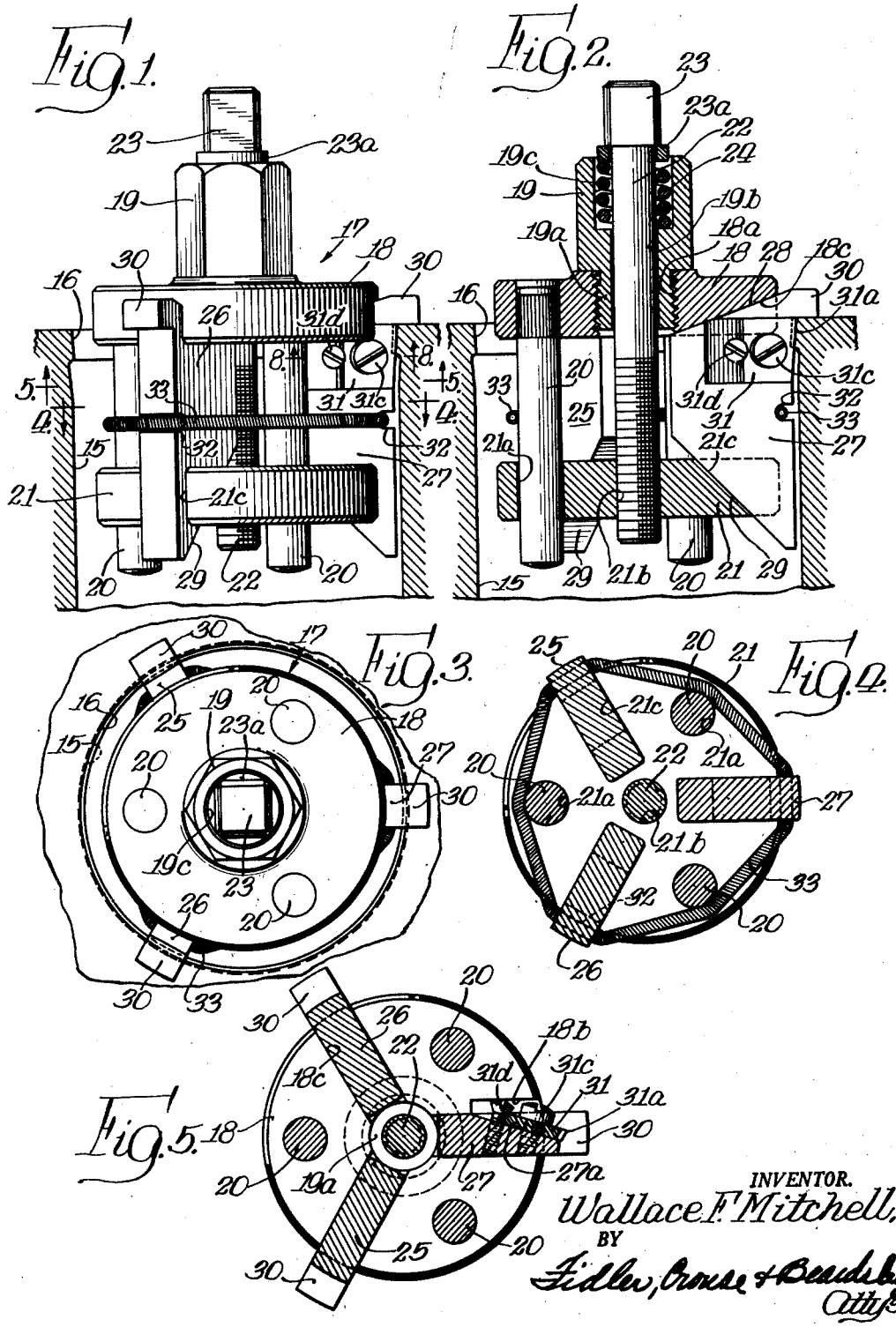
INVENTOR.
Wallace F. Mitchell
BY
Fidler, Crouse & Beadsby
Attys.

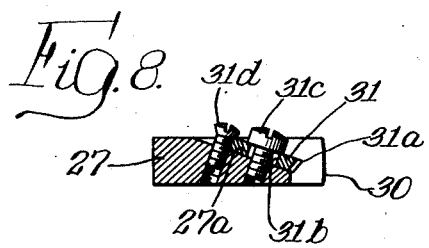
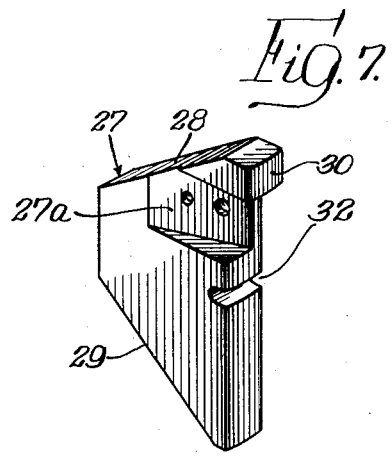
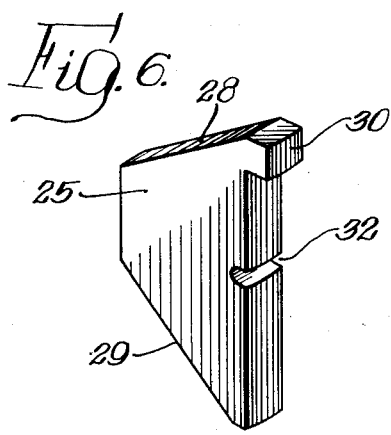
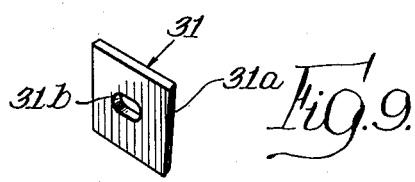
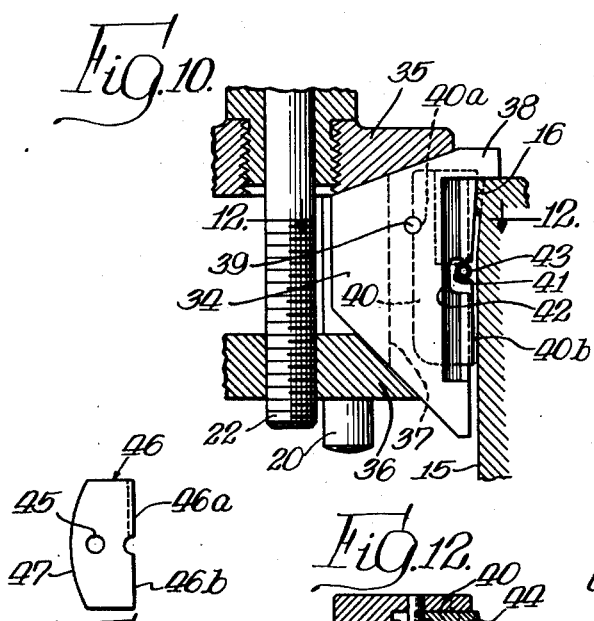
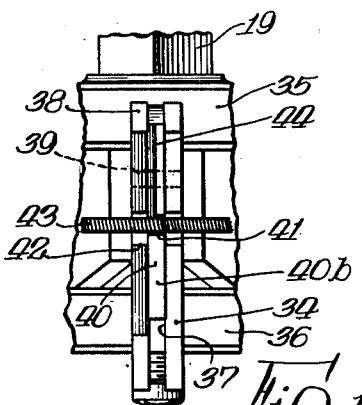

Patented May 5, 1953

2,637,224

UNITED STATES PATENT OFFICE 2,637,224

RIDGE REAMER

Wallace F. Mitchell, Chicago, Ill., assignor to Ammco Tools, Inc., North Chicago, Ill., a corporation of Illinois Application September 3, 1949, Serial No. 113,954

3 Claims. (Cl. 77—2)

My invention relates to tools for truing up worn cylinders and it has to do particularly with a tool for removing circumferential cylinder ridges formed by ring wear.

It is well known that piston rings tend to wear away the cylinder wall surface throughout their range of travel, the upper limit of their travel being below the top of the cylinder, so that a circumferential ridge is left around the top of the cylinder. In reconditioning cylinders it is necessary that this ridge be removed in certain instances to permit removal of the piston from the cylinder and in all instances to avoid breakdown and improper functioning of newly installed rings.

One of the objects of my invention is to provide an improved cylinder ridge reamer which consists of a very few simple and inexpensive parts that are of sturdy construction and which are arranged for quick but positive application of the tool to a cylinder as well as for rapid and highly efficient removal of the cylinder ridge.

Another object is to provide a tool of the foregoing character having a plurality of guides supporting and locating the tool in the cylinder with respect to the ridge to be reamed with one of the guides carrying a reamer blade, the arrangement being such that the reamer blade aids in support of the tool in the cylinder until the ridge is cut away when the supporting guides as a whole become effective to stop the reaming action.

A further object is to provide a ridge reamer arranged as just stated and wherein the reamer blade is automatically expanded toward the ridge to be reamed by the same means which automatically expands and holds the supporting guides against the ridge until the ridge is entirely removed.

Still another object is to provide a ridge reamer having provision for rotatably supporting the tool in a cylinder and for cutting away the cylinder ridge and wherein a single common means is utilized to automatically expand the supporting and cutting means as the ridge is removed, and the supporting means is effective to stop expansion of the cutting means when the ridge has been fully removed.

Other objects and advantages will become apparent from the following description and by reference to the drawings wherein, Fig. 1 is a side elevation of one form of cylinder reamer embodying my invention, the same being shown in a cylinder and adjusted for removing a cylinder ridge;

Fig. 2 is a view similar to Fig. 1 but showing the reamer in section;

Fig. 3 is a top plan view of the structure shown in Fig. 1;

Fig. 4 is a sectional view taken substantially along line 4—4 of Figure 1;

Fig. 5 is a sectional view taken substantially along line 5—5 of Fig. 1;

Fig. 6 is a separated perspective view of one of the guides shown in Fig. 1;

Fig. 7 is a separated perspective view of combined cutter holder and guide shown in Fig. 1;

Fig. 8 is a separated, horizontal sectional view of the cutter holder and guide taken substantially along line 8—8 of Fig. 1;

Fig. 9 is a separated perspective view of the cutting tool shown in Figs. 1, 2, 5 and 8;

Fig. 10 is a fragmentary elevational view, partly in section, showing another embodiment of my invention including a pivoted cutting tool;

Fig. 11 is a fragmentary, elevational view of the structure shown in Fig. 10;

Fig. 12 is a horizontal sectional view taken substantially along line 12—12 of Fig. 10; and Fig. 13 is a side elevational view of a modified form from that of Fig. 10 of pivoted cutting tool bit.

In Figs. 1, 2 and 3 of the drawings, I have shown a cylinder ridge reamer embodying my invention and applied to a cylinder 15 having a ring-wear ridge 16 at the top thereof. The ring wear may be somewhat excessive just below the ridge 16 providing a slightly tapered wall surface at that point requiring the ridge or upper part of the cylinder to be reamed away on a flare or at a slight angle to completely remove the lower part of the ridge and prevent interference with proper ring functioning. This latter condition will be referred to more particularly hereinafter.

The tool shown in Figs. 1 to 9, inclusive, comprises a body portion 17 (Figs. 1 and 2) having an upper end plate 18 with a threaded opening 18a at its center in which is disposed the threaded end 19a of a hollow, hexagonally-shaped drive shank 19. The upper end plate 18 fixedly supports a plurality (preferably three) of depending, circumferentially-spaced post members 20 which freely pass through openings 21a in a bottom or expander plate 21, the posts 20 being adapted to guide the bottom plate 21 in its axial movements toward and from the top plate 18 without relative rotational movement between such plates.

The bottom plate 21 is adjusted toward and from the top plate 18 by a screw stem 22 (Figs. 1 and 2) which has an unthreaded portion that passes freely through the bore 19b of the drive shank with its lower and threaded end adjustably engaged with a threaded axial opening 21b in the bottom plate 21. The outer end of the stem 22 is provided with an enlarged adjusting head 23 which may be rotated by any suitable tool to move the plate 21 toward and from the top plate 18, dependent upon the direction of rotation of the stem. The stem 22 is yieldably urged outwardly, in turn yieldably urging the bottom plate 21 toward the top plate 18, by a spring 24 disposed in an enlarged bore 19c in the outer part of the drive shank 19 and confined between the bottom of such bore and a washer 23a disposed under and against the enlarged head 23 of the stem 22. The purpose of this spring will be referred to more particularly hereinafter.

The top and bottom plates 18 and 21 support a plurality (preferably three) of circumferentially-spaced, radially-expansible tool guiding and supporting members 25, 26 and 27 (Figs. 2 to 7, inclusive), which are adapted to locate the tool vertically or axially within the cylinder in relation to the ridge to be reamed as well as to support the tool for rotation in removing the cylinder ridge. Guide 27, as will be pointed out more specifically hereinafter, also serves to support the reamer blade or cutting tool for removal of the cylinder ridge. Each guide member has inclined top and bottom edges 28 and 29 (Figs. 6 and 7) which converge inwardly toward the center of the tool and which are slidably received in complementally-shaped radial grooves 18c and 21c formed in the adjacent faces of the top and bottom plates 18 and 21. This arrangement is such that as the bottom plate 21 is moved toward the top plate 18 by clockwise rotation of the stem 22, the guides 25, 26 and 27 are expanded outwardly, the bottom surfaces of the grooves in the bottom plate 21 being at a steeper angle than those in the top plate 18, to effect a more uniform and positive movement of the guides without the application of excessive pressure to the adjusting means. Each of the guides 25, 26 and 27 is provided at its upper edge with a projecting ledge 30 (Figs. 1, 2, 6 and 7), the under surface of which is disposed in a plane at right angles to the axis of the tool so that when the tool is inserted in the cylinder these ledges seat flush upon the top surface of the cylinder 15 thereby limiting the extent that the tool may be inserted in the cylinder and positioning the tool therein with its axis on the axis of the cylinder.

The blade or cutter supporting guide 27 is provided at its upper end with a cutout or blade-receiving recess 27a formed in one side thereof, the upper edge of which is disposed in horizontal alignment with the under surface of the adjacent projecting ledge 30 so as to lie in the plane of the upper surface of the cylinder 15 which, in turn, is the upper edge of the ridge 16 to be reamed. The width of the recess or cutout 27a is substantially equal to the width of the reamer blade and it extends from the outer edge of the guide 27 inwardly with its bottom at an angle to the plane of the side of the guide, as clearly shown in Fig. 5, to provide desirable clearance for the cutting edge of the reamer blade. A flat reamer blade 31 (Figs. 2, 5, 8 and 9) having a cutting edge 31a is mounted against the inclined bottom of the recess or cutout 27a with its cutting edge 31a very slightly projecting beyond the outer edge of the guide so that, when the tool is inserted in the cylinder this cutting edge will engage the ridge 16 to be reamed. The cutting edge 31a of the blade is slightly inclined inwardly (at approximately 1½° angle) from adjacent the upper edge of the guide so that the lower edge of the cutting blade coincides substantially with the outer edge of the guide and its upper portion adjacent the ridge 16 projects slightly so as to entirely remove the ridge before the lower portion of the guide engages the cylinder wall following removal of the ridge. This inclination also enables the ridge to be cut away on a flare so as to be certain to remove all parts of the ridge from top to bottom thereof which might interfere with the proper functioning of newly-assembled piston rings. The blade 31 is provided with an elongate slot 31b through which passes the shank of a threaded fastening screw 31c. The slot 31b permits longitudinal adjustment of the blade 31 to properly position its cutting edge. A back-up screw 31d may also be employed at the inner end of the blade 31. When the fastening screw 31c is tightened the blade is secured in place. The top plate 18 is provided with a clearance slot 18b to accommodate the heads of the screws 31c and 31d.

Each of the guides 25, 26 and 27, near the central portion of its outer edge, is provided with a recess 32 in which is received a garter spring 33 which not only prevents displacement of the guides from their respective grooves 18c and 21c but also tends constantly to move such guides to their fully retracted position.

In the use of a tool of the foregoing character the adjusting stem 22 is first moved counter-clockwise to move the bottom plate 21 away from the top plate 18 to permit the garter spring 33 to contract the guides 25, 26 and 27 inwardly sufficiently to insert the tool within the cylinder 15. The tool is then inserted in the cylinder until the supporting ledges 30 engage the upper surface thereof, at which time the tool is not only properly positioned with respect to the axis of the cylinder but the reamer or cutting blade 31 is located in proper position with respect to the ridge 16 to be reamed. The adjusting stem 22 is next rotated in clockwise direction to draw the bottom plate 21 toward the top plate 18 and initially expand the guides until guides 25 and 26 and the reamer blade 31 abut the ridge 16. When this is done, the guides 25 and 26 and the blade 27 serve to rotatably position the tool in the cylinder for the reaming operation. However, after the tool has been thus initially adjusted the stem 22 is rotated to a further extent to place the spring 24 under compression to cause the bottom plate 21 to automatically move to expand the guides as the ridge 16 is being removed. The stem 22 (Fig. 2) is preferably additionally rotated to a sufficient extent to compress the spring to cause the tool to be expanded to completely remove the ridge 16, the arrangement being such that when the ridge is completely removed further expansion action cannot take place even though the spring 24 be conditioned to accomplish that. This arrangement prevents over-reaming of the upper portion of the cylinder and is accomplished in that as the ridge is removed the guide members 25 and 26 as a whole and the lower portion of the guide member 27 approach closer and closer to the cylinder wall surface below the ridge, and by the time the ridge is completely removed all of the guides abut the cylinder wall below the ridge and prevent further expansion of the reamer blade and, in turn, further reaming operation. The angular position of the cutting edge of the reamer blade 31 insures that the ridge will be cut away completely from top to bottom. Rotation of the tool during the reaming operation is accomplished by any suitable tool applied to the drive shank 19. If desired the drive shank may comprise part of a universal drive connection of any well-known form (not shown) so that the tool may be operated by power means or otherwise.

In Figs. 10, 11 and 12 I have shown a modified form of my invention which differs mainly from the previously described form in that the reamer blade is pivotally mounted in one of the supporting guide members so that, as that guide member approaches the cylinder wall, the blade is gradually adjusted toward an angular position to completely ream the cylinder ridge. In other words, this form of my invention is the same in all respects as that previously described except the blade supporting guide and the blade carried thereby.

Referring particularly to Figs. 10 to 12, inclusive, the blade supporting guide 34 is mounted within grooves in the top end plate 35 and the expansible bottom plate 36, in the manner previously described, for expansion and contraction movements. The outer edge of the guide 34 is provided with an inwardly extending rectangular slot 37 extending from end to end of the guide and through the supporting ledge portion 38 thereof. A pivot pin 39 extends through the slot 37 near the rear wall thereof and somewhat above the center of the guide, as best shown in Fig. 10.

The slot 37 is adapted to receive a rectangularly-shaped reamer blade device 40 which is provided in its inner edge with a semi-circular recess 40a adapted to receive the pivot pin 39 and pivotally support the blade 40 therein while permitting ready outward removal thereof. The outer edge of the blade 40 is provided with a rounded notch or groove 41 aligned with similarly-shaped and somewhat larger grooves 42 in the outer edge portions of the guide 34 defining the slot 37. The grooves 41 and 42 are adapted to receive a garter spring 43 which also engages the other supporting guides, as in the previously described form, thereby holding not only the guides in place but also the reaming blade pivotally in position. This spring 43 also tends to contract the supporting guides and blade when expanding pressure thereon is relieved as in the first-described form.

The reamer blade 40 is so formed that the part thereof above the groove 41 therein is shaped and properly treated to provide a cutting edge 44, while the portion thereof below the groove 41 is smoothed and rounded transversely to provide a non-cutting and cylinder wall abutting portion 40b which will not injure the cylinder wall surface when engaged thereby. The depth of the cutting blade 40 is less than the depth of the slot 37 (Fig. 12) so that the cutting blade may pivot therein until its lower portion 40b is moved within the slot 37 and the adjacent surface of the guide 34 abuts the cylinder wall. In other words, although the blade normally assumes a near vertical position with its portion 40b engaged with the cylinder wall when initially engaged with a ridge to be reamed, the blade supporting guide expands as the ridge is cut away to a point where its lower portion may engage the cylinder wall. During this action the blade is moved pivotally and positioned to fully cut away the ridge on a flare so as to completely remove the ridge. This is particularly useful where there has been excessive ring wear immediately beneath the ridge, forming a taper at that point. The reaming action will continue, as in the first-described form, until the outer edge of the blade support engages the cylinder wall, at which time further expansion of the tool is prevented and the reaming operation is stopped. Other than just described, the operation of this form of my invention is the same as that first mentioned.

In Fig. 13 I have shown a further modification of reamer blade. In this form the blade is the same as that just described except that it is provided with an opening 45 adapted to receive a pivot pin so that the blade cannot be removed without removal of such pin. In this form the upper part 46 of the blade member is shaped and treated to provide a cutting edge 46a as in the blade shown in Fig. 10, while the lower part 46b is rounded for abutment with the cylinder wall without injury thereto. To facilitate the rocking movement of this particular blade its rear portion is curved as at 47.

I believe that the objects and advantages of my invention will be well understood from the foregoing description. My invention not only provides a device requiring but a few simple and inexpensive parts but it also insures efficient reaming of cylinder ridges quickly, with a minimum of adjustment and at a much reduced cost. It further assures complete removal of the cylinder ridge without injury to the cylinder wall.

I claim:

1. A ridge reamer comprising a pair of spaced end plates, one of which is adjustable toward and from the other, means for adjusting said one end plate, a plurality of circumferentially-spaced and elongated supporting guide members carried by said end plates for expansion and contraction movements as said one end plate is appropriately adjusted, spring means surrounding the outer edges of said guide members and constantly urging them in contracting direction, each of said guide members having a radially projecting ledge at the top of the outer edge thereof adapted to rest upon the upper face of the cylinder having the ridge to be reamed to position the reamer therein, and one of said guide members having a longitudinal slot in its outer edge extending substantially throughout the length thereof, a rectangularly-shaped reamer blade member mounted in the slot of said one guide member, a pivot element bridging said slot against which said blade member pivotally seats, the upper outer edge of said blade member being formed to provide a cutting edge disposed immediately below the said ledge of said guide member, and the lower outer edge of said blade member being rounded transversely to provide a dull cylinder wall engaging surface, said spring means being positioned below the plane of said pivot element and engaging the outer edge of said blade member thereat to retain said blade member in place and to constantly urge its cutting edge portion outwardly.

2. A tool for removing ring-wear ridges from cylinders which comprises a pair of end plates, one of which is movable toward and from the other, means for moving said one end plate, a plurality of circumferentially-spaced elongate supporting-and-guiding members having their opposite ends mounted between said end plates with their outer edges projecting outwardly therefrom and adapted to be expanded and contracted radially by movement of said one end plate in appropriate direction, a spring surrounding the outer edges of said guide members and constantly urging them in contracting direction, radially projecting ledges on the upper outer edges of said guide members adapted to seat upon the upper face of the cylinder to position the tool therein, one of said guide members having a comparatively deep and elongate slot formed in its outer edge surface, a pivot element bridging said slot inwardly of the outer edge of said guide member, and a rectangularly-shaped blade member mounted in said slot and having a groove on its inner edge above the center thereof receiving said pivot element for pivotal support of said blade member, the upper outer edge of said blade member having a cutting edge thereon and its lower outer edge beneath said cutting edge being rounded transversely to provide a dull cylinder wall engaging portion, said pivot element being so located and said blade member being of such depth that its said cutting edge and rounded edge project slightly beyond the adjacent surface of said guide member when said cutting edge and rounded edge are substantially parallel therewith, said spring also surrounding the rounded portion of said blade member below said pivot element and constantly urging said cutting edge outwardly toward the ridge to be reamed.

3. A tool for removing ring-wear ridges from cylinders which comprises a pair of end plates, one of which is movable toward and from the other, means for moving said one end plate, a plurality of circumferentially-spaced elongate supporting-and-guiding members having their opposite ends mounted between said end plates with their outer edges projecting outwardly therefrom and adapted to be expanded and contracted radially by movement of said one end plate in appropriate direction, radially projecting ledges on the upper outer edges of said guide members adapted to seat upon the upper face of the cylinder to position the tool therein, one of said guide members having a slot in its outer edge surface extending throughout a substantial portion of the length thereof, said one guide member having a pivot element therein disposed on a transverse axis, a blade unit mounted in said slot and including a pivot element pivotally engaging the pivot element in the guide member, said blade unit having an upper cutting edge portion and a lower relatively dull non-cutting portion, said pivot elements being so located and said blade unit being of such depth that its said cutting edge portion and dull edge portion project slightly beyond the adjacent edge surface of said guide member when said edge portions are substantially parallel therewith, and spring means engaged with said blade unit and extending circumferentially of said guide members for yieldably and detachably retaining said blade unit in its guide member and for biasing all of said guide members inwardly.

WALLACE F. MITCHELL.

References Cited in the file of this patent

UNITED STATES PATENTS

| Number | Name | Date |
|---|---|---|
| 1,909,347 | Hall | May 16, 1933 |
| 1,927,594 | Olson | Sept. 19, 1933 |
| 1,980,288 | Olson | Nov. 13, 1934 |
| 2,226,015 | Phillips et al. | Dec. 24, 1940 |
| 2,380,605 | Mitchell | July 31, 1945 |
| 2,487,638 | Danielson | Nov. 8, 1949 |